COGSWELL & MATHEWSON.
Corn and Cane Harvester.

No. 24,992.

2 Sheets—Sheet 1.

Patented Aug. 9, 1859.

Witnesses:

Inventors:

COGSWELL & MATHEWSON.
Corn and Cane Harvester.

No. 24,992.

2 Sheets—Sheet 2.

Patented Aug. 9, 1859.

UNITED STATES PATENT OFFICE.

W. COGSWELL AND C. A. MATHEWSON, OF OTTAWA, ILLINOIS.

IMPROVEMENT IN CORN-HARVESTERS.

Specification forming part of Letters Patent No. 24,992, dated August 9, 1859.

*To all whom it may concern:*

Be it known that we, W. COGSWELL and C. A. MATHEWSON, both of Ottawa, in the county of La Salle and State of Illinois, have invented a new and Improved Sugar-Cane and Corn Harvester; and we do hereby declare that the following is a full, clear, and exact description of the same, reference being had to the annexed drawings, making a part of this specification, in which—

Figure 1:
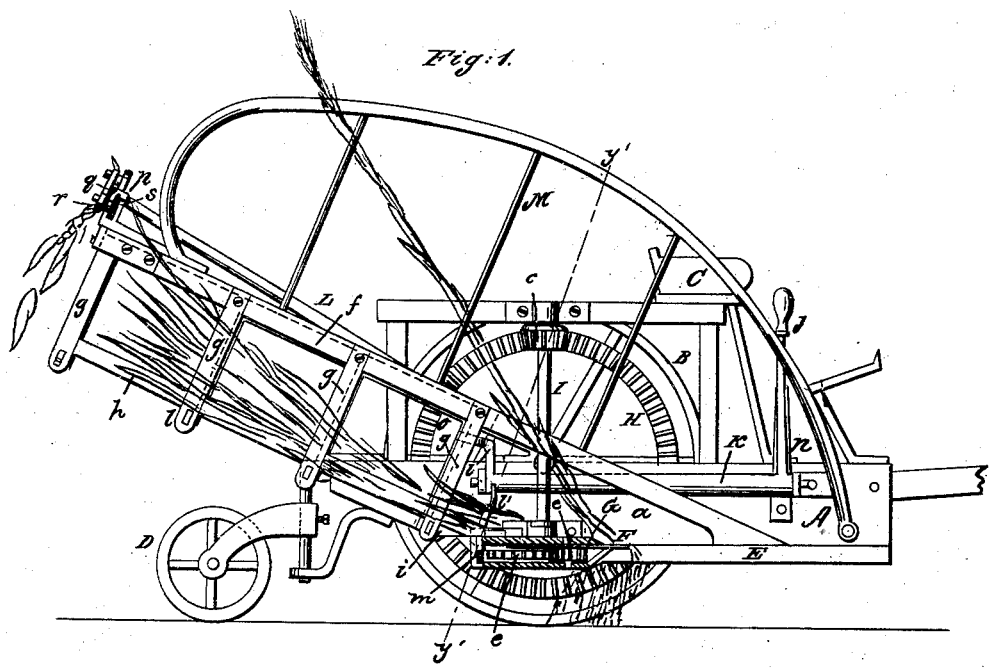
Figure 3:
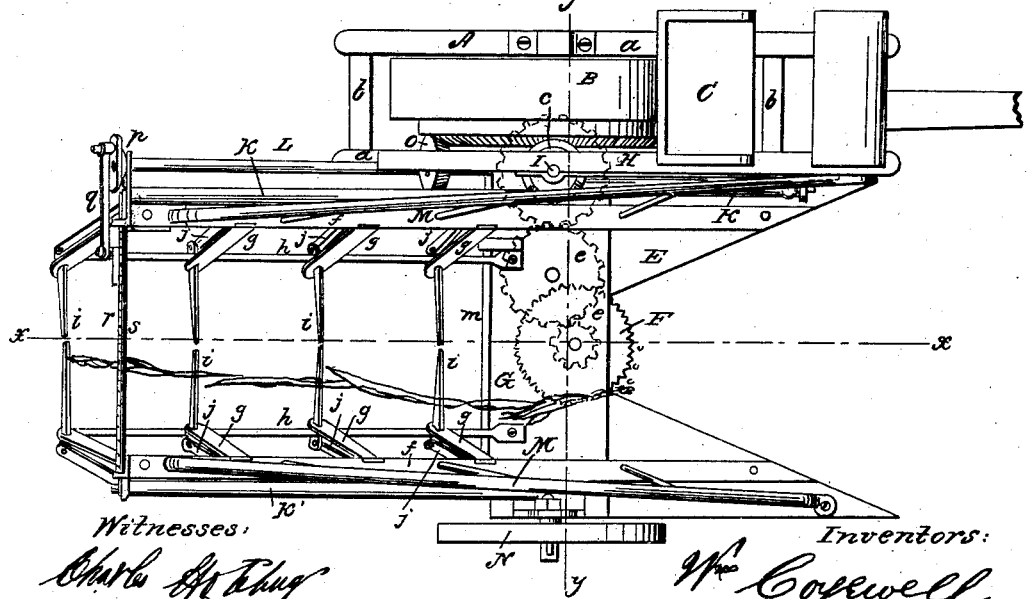
Figure 2:
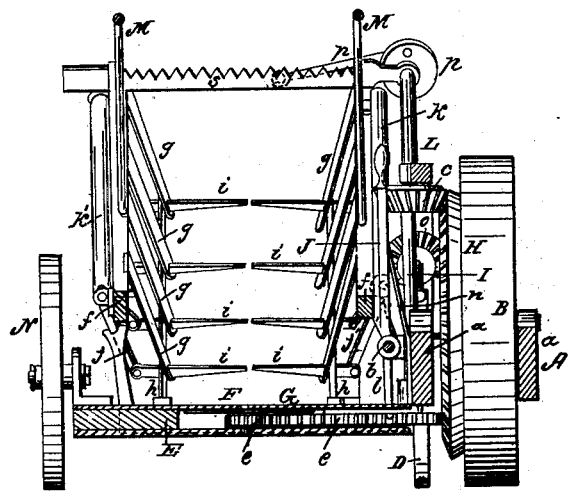
Figure 4:
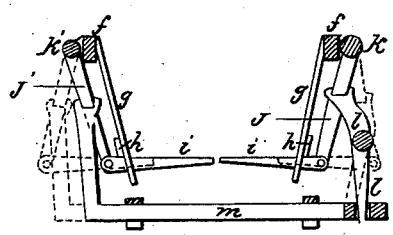

Figure 1 is a side sectional view of our invention, taken in the line $x\ x$, Fig. 3. Fig. 2 is a transverse section of the same, taken in the line $y\ y$, Fig. 3; Fig. 3, a plan or top view of the same; Fig. 4, a transverse section of the same, taken in the line $y'\ y'$, Fig. 1.

Similar letters of reference indicate corresponding parts in the several figures.

This invention consists in the employment or use of a rotary and reciprocating cutter and movable bed placed on a mounted frame and arranged as hereinafter described, whereby the standing cane or corn may, as the machine is drawn along, be cut and deposited in proper-sized gavels on the earth.

To enable those skilled in the art to fully understand and construct our invention, we will proceed to describe it.

A represents the main frame of the machine, which is formed of two parallel side pieces, $a\ a$, connected by traverse-pieces $b\ b$. In this main frame the driving-wheel B is placed about centrally, and on the frame the driver's seat C is placed. The back part of the main frame is supported by a caster-wheel, D.

To one side of the main frame A a platform, E, is attached. This platform has a V-shaped opening at it front part, and a horizontal circular toothed cutter, F, is placed at the inner end of the V-shaped opening. The cutter F is constructed very similarly to a circular saw, and, with the exception of its front portion, is covered by a plate, G, as shown in Figs. 1 and 3.

To the inner side of the driving-wheel B a toothed wheel, H, is attached, and into this wheel a pinion, $c$, gears, said pinion being at the upper end of a vertical shaft, I, which has a toothed wheel, $d$, on its lower end, said wheel $d$ being connected with the cutter F by gearing $e$, as shown more particularly in Figs. 2 and 3.

To the platform E two inclined bars, $f\ f'$, are attached, one at each side. These bars extend some distance back of the platform, and have each pendent bars $g$ attached to them at right angles. The lower parts of the pendent bars $g$ are connected and braced by bars $h$, and through the lower part of each bar $g$ a finger, $i$, passes. The fingers $i$ are attached by pivots to rods $j$, the upper ends of which are secured to shafts $k\ k'$, placed one at the outer side of each bar $f$. The shafts $k\ k'$ are allowed to turn freely in the bearings, and both shafts are turned, when necessary, by actuating a single hand-lever, J, which is attached to a shaft, K, at the inner side of the main frame A. To the back end of shaft K two arms, $l\ l$, are attached, one arm $l$ being connected to a bar, $j$, of the shaft $k$, and the other attached to a bar, $m$, which is connected to a bar, $j$, of the shaft $k'$. By this arrangement it will be seen that the two shafts $k\ k'$ will be turned simultaneously by actuating the lever J. The lever J has a spring, $n$, bearing against it, said spring having a tendency to keep the fingers $i$ forced inward through the lower ends of the bars $g$, as shown clearly in Figs. 2, 3, and 4.

Into the wheel H of the driving-wheel B a pinion, $o$, gears. This pinion is on an inclined shaft, L, which has a crank-pulley, $p$, on its outer end, the pulley $p$ being connected by a rod, $q$, with a sickle, $r$, which extends across the back ends of the bars $f\ f$, and works over a stationary sickle-plate, $s$, that is attached to the back ends of the bars $f\ f$. The reciprocating sickle $r$, as well as the stationary one, $s$, are provided with the pointed triangular teeth such as are generally used in grass and grain harvesters.

On each bar $f$ a railing or fence, M, is secured. The form of these is plainly shown in Fig. 1. The outer side of the platform E is supported by a wheel, N.

The operation is as follows: The machine is drawn along by one or two horses attached to the main frame A, and the standing stalks or cane are gathered into the recess of the platform, and the saw or cutter F cuts them off a short distance above the surface of the ground, the saw or cutter F being rotated from the driving-wheel by the gearing H $c\ d\ e$. The cut stalks or cane, by the forward movement of the machine, are thrown backward, and the tops are taken off by the action of the reciprocating sickle $r$, in connection with the stationary sickle-plates s, the stalks or cane then falling on the fingers i, which form a bed to receive them, as shown in red, Figs. 1 and 2. When a sufficient number of stalks or cane have been cut to form a gavel of requisite size, the driver, from his seat C, actuates the lever J, and thereby throws outward the fingers i and discharges the gavel on the ground.

The cutters r s are a valuable acquisition in the harvesting of cane, as the worthless portions or ends are cut off and compact gavels formed.

We do not claim any of the parts separately, for we are aware that rotary cutters have been used, and also movable beds or bottoms, to discharge the cut stalks or cane in gavels; but We do claim as new and desire to secure by Letters Patent—

The circular cutter F and the reciprocating sickle r, with its stationary toothed plate s, in connection with movable bed or fingers i, the whole being placed on a mounted frame and arranged for joint operation substantially as and for the purpose set forth.

WM. COGSWELL.
C. A. MATHEWSON.

Witnesses:
CHARLES HOTALING,
CHARLES SNOW.